Figure 1:
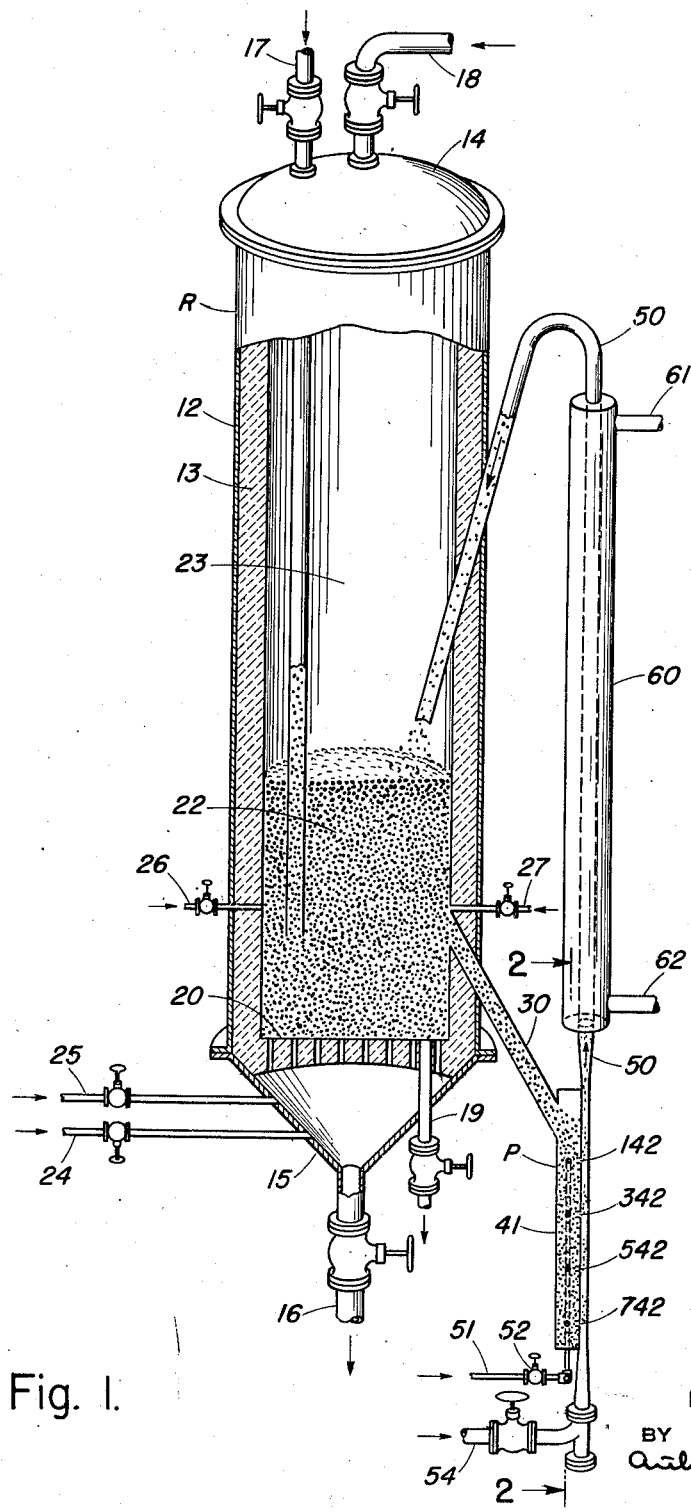

INVENTORS
Hermann W. Behme
Walter C. Lapple
BY Arthur Middleton
ATTORNEY

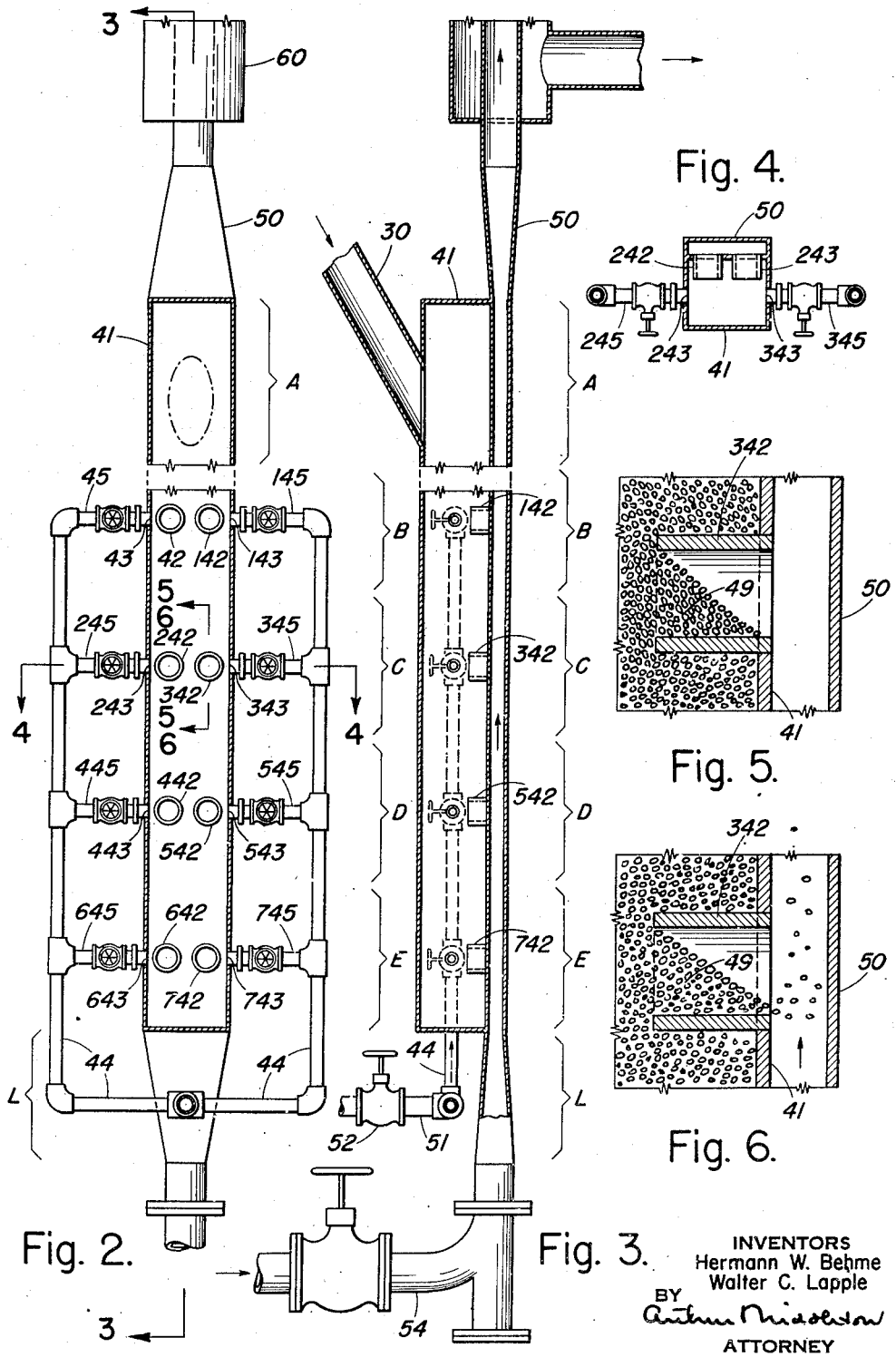

July 27, 1954     W. C. LAPPLE ET AL     2,684,890
HANDLING PULVERULENT MATERIALS
Filed May 21, 1951     3 Sheets-Sheet 3

Flow motivating Air     Carrier Air

INVENTORS
Hermann W. Behme
Walter C. Lapple
BY
ATTORNEY

Patented July 27, 1954

2,684,890

UNITED STATES PATENT OFFICE 2,684,890

HANDLING PULVERULENT MATERIALS

Walter C. Lapple, Westport, and Hermann W. Behme, Norwalk, Conn., assignors to The Dorr Company, Stamford, Conn., a corporation of Delaware Application May 21, 1951, Serial No. 227,435

2 Claims. (Cl. 23—288)

This invention relates generally to the art of handling finely-divided solids or pulverulent materials and particularly to ways and means for controllably flowing such solids from a single supply thereof through a plurality of outlets. More particularly it relates to ways and means for introducing finely-divided solids into the solids-conveying gas stream of a solids-conducting conduit.

Heretofore when it has been desired to discharge solids from a single supply thereof through a plurality of points, a plurality of external valves or other mechanical flow-controlling devices has been used. Such devices, although successful, are nevertheless expensive in initial cost as well as in operation and maintenance due to the erosion wear caused by the passage of abrasive solids therethrough and this tendency is greatly increased when hot solids are being handled.

When it is desired to discharge finely-divided solids from a single supply thereof into the solids-conveying gas stream of a generally vertical solids-conducting conduit, then the above-mentioned devices are used in combination with means for injecting such solids into the solids-conveying gas stream. Such injecting means usually involve means for forcibly injecting the solids into the gas stream to be picked up by the entraining action of the gas stream. Such prior methods and devices are successful, but their operation is limited to a narrow range due to the fact that the solids-conveying gas stream has a tendency to become locally overloaded, thus causing plugging and cessation of solids flow. That is to say, the concentration of solids thus introduced into a solids-conveying gas is held to a relatively low value due to the limited capacity of such a gas stream under prior methods.

It is one object of this invention to provide ways and means for controllably flowing finely-divided solids from a single source thereof through a plurality of discharge outlets without the use of external solids flow control valves or mechanically operated solids-flow valves of any sort. Additionally, such ways and means will be simple of construction yet will have long wearing qualities even when used to handle hot solids; and can be made an integral part of the solids supply station rather than constructed external to such station.

It is another object of this invention to provide ways and means for controllably introducing finely divided solids into a solids-conveying gas stream whereby the solids carrying capacity of such gas stream is greatly increased over the capacity normally expected of such gas stream. A still further object is to insure a desired uniform concentration of solids in such a gas stream thus providing greater efficiency of solids transport especially when such solids are transported through heat exchange apparatus or to critically controlled processes.

In its broadest aspect this invention revolves about the concept of establishing and maintaining a quantity of finely-divided solids as a vertically extending body of such solids provided with a plurality of laterally directed discharge outlets. A solids-supporting surface extends from each discharge outlet inwardly to the body of solids. These solids-supporting surfaces are of sufficient length so that solids of the body will normally be seated thereon in non-flowing angles of repose. In other words, the discharge outlets have integrated therewith means for preventing the flow of normally reposed solids. A plurality of streams of solids-motivating gas are projected through a plurality of gas-inlets to flow through the body of solids and exit from the outlets, such exciting gas streams having sufficient velocity to unseat the normally reposing solids and deflect them through the outlets. The rate of solids discharge from the outlets is controlled by regulating the velocities of the solids-motivating gas streams, and rates of discharge from the several outlets may be independently or simultaneously varied.

The discharge outlets are so located with respect to each other and to the gas-inlets that there exists a path of least resistance from any one gas-inlet to one or more discharge outlets coordinately located with reference to such inlet. In other words, a plurality of solids discharge zones is established within the body of solids and each such zone has a gas-inlet so located with reference to one or more solids outlets of such zone that there exists between such inlet and such outlet a path of least resistance along which gas projected through the inlet will flow to exit from the outlet. The resistance offered by the surrounding body of solids substantially prevents the projected gas from leaving the path of least resistance.

When several such solids discharge zones are established within a single body of solids and are properly located with respect to each other, they will each be selectively operable independently of the other zones. That is to say, each zone is of sufficient size to substantially contain its own projected gas streams and thus to prevent the gas streams of the several zones from commingling within the body of solids.

When utilized to introduce solids into a solids-conveying gas stream the several outlets are discharged into a common conduit through which a solids-conveying gas stream is flowing. The discharge outlets are so located that solids are incrementally introduced into such gas stream.

This incremental addition of solids into the gas stream provides for a much greater maximum solids-carrying capacity of such gas stream by preventing local overloading and providing for uniform acceleration of the added solids thus insuring a gas-solids stream of substantially uniform density which density can be controlled according to the needs of the operator by regulating the velocity of the solids-motivating gas streams and thus the rate of solids discharge through the outlets into the solids-conducting conduit.

An important feature of this invention resides in the fact that the body of solids from which solids-flow is originated is a compact body of solids resting more or less statically within its container and is to be contrasted with a fluidized body of solids as hereinafter described. A further feature lies in the fact that the solids-motivating gas streams supplied to the body of solids have low velocities, such velocities being sufficient to disturb the solids non-flowing angles of repose in the outlets to cause the solids to flow from such outlets at a desired rate and such velocities are to be contrasted with the high velocities commonly employed in solids-conveying systems.

Briefly stated, this invention contemplates the controlled uniform upward flow of a high concentration of finely-divided solids through a generally vertical solids transport conduit and proposes to accomplish this by feeding finely-divided solids into a generally vertical standpipe or columnar zone having a plurality of laterally directed outlets communicating with a generally vertical transport conduit in order to establish within such columnar zone a single dense compact column of such solids adapted to normally assume non-flowing angles of repose in such outlets, supplying an uprising stream of carrier gas to the generally vertical transport conduit at solids carrying velocities, supplying solids flow motivating gas to the solids of the columnar zone at a plurality of points causing solids of the column therein to flow from the outlets into the transport conduit to be picked up by the uprising carrier gas stream and controlling the concentration of solids within such gas stream by regulating the quantity of solids motivating gas supplied to the columnar zone.

Summarizing, this invention provides ways and means for controllably flowing finely divided solids from a dense column of such solids into a carrier gas stream at a plurality of points along such stream whereby the solids carrying capacity of such gas stream is greatly increased.

According to this invention the carrying capacity of a carrier gas stream is greatly increased while maintaining a smooth flow of gas-solids through the transport line. This is very important especially in heat exchange apparatus where a high solids concentration means a more efficient operation. Moreover, this invention provides for a greater flexibility of control over the concentration of solids in the transport conduit even though the velocity of the carrier gas stream remains constant. This is so because this invention increases the capacity of any given carrier gas stream over the capacity exhibited by an identical stream when employed in prior ways and means of solids transport.

Although we have invented ways and means for increasing the efficiency of any given carrier gas stream for the foregoing purposes, nevertheless there are limits upon the capacity of any such stream. For any given material the practical maximum concentration obtainable in a carrier gas stream depends upon the physical properties of that material and may be calculated from the following relationships.

$$V_0 - \frac{R}{\rho_f} = \frac{V_A}{K^2}\left[1 + \left(\frac{NV_A}{Ka}\right)^{2/3}\right]$$

where $V_0$ = upward space rate of carrier gas in the transport conduit (ft./sec.).
$R$ = solids upward mass rate in the transport conduit (lb./ft.$^2$ sec.).
$\rho_f$ = solids concentration in the transport conduit (lb./ft.$^3$).
$V_A$ = terminal velocity of the solids in air (ft./sec.).
$N$ = the number of particles per cubic foot in the transport conduit.
$a$ = constant = $5 \times 10^8$.
$K$ = voidage correction = $1/e + 4(1-e)$.
$e$ = fraction voids in the transport conduit by volume.

Space rate ($V_0$) is that rate at which the carrier gas would flow through the transport conduit if no solids were present in such conduit. The fraction of voids in the transport conduit ($e$) is that fraction of the total volume of the transport conduit that is unoccupied by solids. The constant ($a$) is an empirical constant for the above relationship. The other terms are self-explanatory with the short definitions furnished. From this relationship the maximum solids concentration and thus the upper limit of operation for this feature of the invention can be calculated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by those claims.

Figure 8:
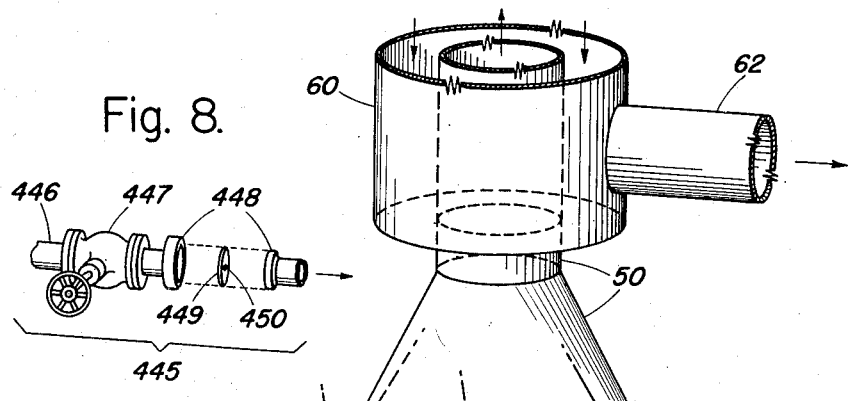
Figure 7:
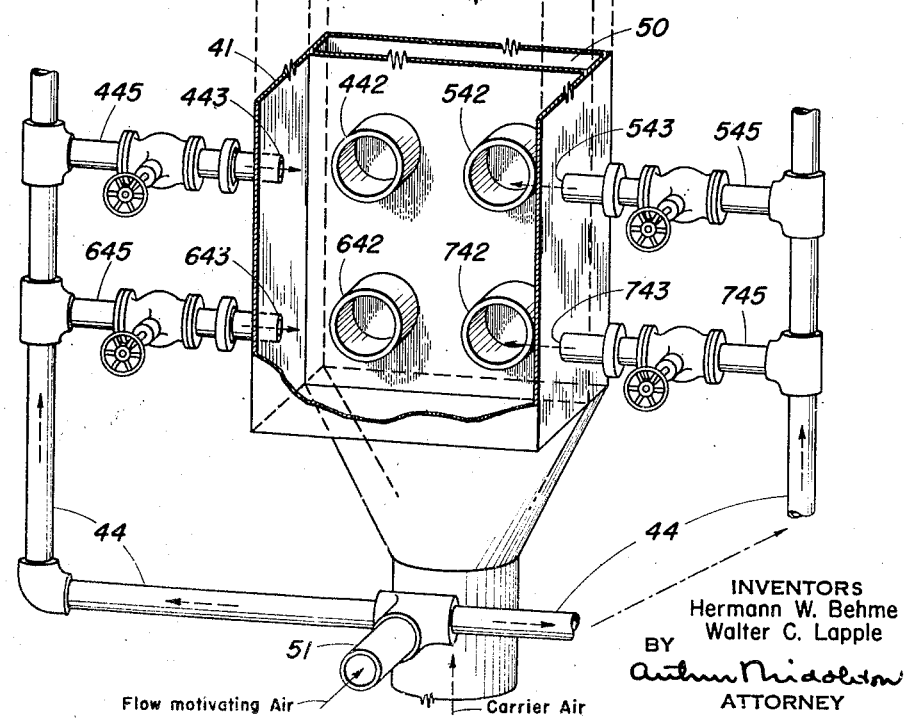

In the drawings, Figure 1 shows a preferred embodiment of this invention in association with a fluidized solids reactor and an external heat exchanger. Figure 2 is a detailed cutaway plan view taken along lines 2—2 of Figure 1. Figure 3 is a side view taken along the lines 3—3 of Figure 2. Figures 5 and 6 are detailed views taken along lines 5—5 and 6—6 of Figure 2 and showing one discharge outlet under different conditions of operation. Figure 7 is a cutaway perspective view showing zones A, D, E and L of Figure 2 as well as details of the solids transport conduit and the coolant jacket. Figure 8 is an exploded view showing details of the motivating gas regulating assemblies.

Since Figure 1 shows an embodiment involving a fluidized solids reactor it will be advisable to discuss briefly the general nature and operation of such reactors in solids fluidizing operations.

In general, in the fluidized solids technique for treating ores, a bed of finely-divided ore particles is maintained as a dense mobilized homogeneous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream, but at a velocity insufficient to cause the gas to entrain and carry out of the reactor any substantial quantity of solid particles. Under such conditions the bed is called a fluidized bed. The fluid level of this fluidized bed is maintained by the use of a solids discharge arrangement so that as more solid particles are introduced into the bed the resulting increased depth will cause other particles to discharge from the bed.

Due to the turbulence of the fluidized beds, heat exchange by and among the particles thereof is almost instantaneous so that if two batches of particles, each at a different temperature from the other, are commingled in a fluidized bed the resulting mixture will almost instantly assume a temperature intermediate the temperatures of the batches commingled. Further, this rapid heat exchange creates a substantially uniform temperature throughout the bed.

In Figure 1 the reactor assembly R is made up of a cylindrical chamber having a metal outer wall 12 and lined with refractory material 13 having a top 14 and a coned bottom 15. In the bottom section of the reactor is a perforated constriction plate 20 adapted to hold thereon a fluidized bed of finely-divided solids 22 above which is a freeboard space 23. Finely-divided solids to be treated are introduced into the reactor through valved conduit 17. Fluidizing gas is supplied to the bottom of the reactor through valved conduit 24. External fuel for supplying heat for starting up is supplied through valved conduit 25 and combusted in a burner not shown. Fuel when needed during operation is supplied through valved conduits 26 and 27. Exhaust gases leave the reactor through valved conduit 16.

Valved conduit 16 is provided for cleaning out the coned bottom 15 and valved conduit 19 is provided to withdraw solids from bed 22 if desired. Conduit 30 leads from bed 22 into pickup section P. Pickup section P the elements of which can be of any suitable material and cross-sectional shape, is made up of solids receiving chamber 41 and solids-conducting conduit 50 both of which are coextensive along the length of chamber 41 and which communicate with each other through laterally directed discharge outlets 142, 342, 542 and 742. Details of the internal construction of pickup section P are shown in Figures 2 through 7 inclusive. Flow motivating gas is supplied to chamber 41 through conduit 51 and the quantity of gas so supplied is controlled by valve 52.

A solids-conveying or carrier-gas stream is introduced into solids transport or solids-conducting conduit 50 through valved conduit or Y section 54. Conduit 50 passes upwardly through heat exchange jacket 60 which is provided with communicating conduits 61 and 62 for circulating heat-exchange material through jacket 60. Conduit 50 then passes into the freeboard space 23 of reactor R. In operation, hot solids are discharged from bed 22 via conduit 30 into solids receiving chamber 41. Carrier gas is introduced into solids-transport conduit 50 via conduit 54. Flow-motivating gas is introduced into chamber 41 through conduit 51 and this gas enters chamber 41 at a plurality of points and causes the flow of solids through outlets 142, 342, etc., into transport conduit 50 where they are picked up by the carrier gas stream and passed upwardly through conduit 50 in heat exchange relationship with the coolant flowing through jacket 60. The heated coolant is discharged to other uses while the cooled solids are returned to the reactor. The level of bed 22 may be controlled by valved conduit 19 and if it is desired to change the content of the bed valve 19 may be partially open to withdraw solids while at the same time additional solids are introduced through conduit 17.

Figure 2 is a cutaway view of pickup section P taken along the lines 2—2 of Figure 1. Pickup section P is made up of zones such as A, B, C, D and E as well as a lower section L. Zone A is the upper portion of pickup section P and is where solids are introduced into the solids receiving chamber 41.

Zones B, C, D and E are identical to each other in function and operation and a detailed description of one such zone will suffice to describe the elements of all zones.

Referring now to zone C, the view is a plan view looking toward chamber 41. Discharge outlets are shown at 242 and 342. Motivating gas inlets are shown at 243 and 343 while gas-flow regulating assemblies are shown at 245 and 345. Solids in chamber 41 would normally be seated in repose in outlets 242 and 342, however solids-flow motivating gas introduced via gas-manifold 44 enters chamber 41 via regulating means 245 and 345 through gas-inlet points 243 and 343 and exits from outlets 242 and 342 unseating the reposed solids to deflect them through the outlets. Carrier gas enters conduit 50 at the bottom thereof and passes upwardly therethrough.

Figure 3 is a cutaway side view taken along the lines 3—3 of Figure 2. In Figure 3 solids receiving chamber 41 is shown in relationship to conduit 50 along the length of chamber 41. Communicating outlets 142, 342, 542 and 742 are shown providing solids outlet from chamber 41 to conduit 50. Solids are introduced into chamber 41 via conduit 30. Motivating gas is introduced into chamber 41 via conduit 51, the total quantity of such gas being regulated by valve 52, and this regulated quantity of gas is distributed via gas-manifold 44. Solids-conveying gas enters conduit 50 via valved conduit 54. Conduit 50 after passing coextensively along the length of chamber 41 then passes upwardly through jacket 60.

Figure 4 is a top view taken along the lines 4—4 of Figure 2. In Figure 4 is shown conduit 50, solids receiving chamber 41, and outlets 242 and 342 communicating therebetween. Motivating gas is introduced at points 243 and 343 via flow regulating assemblies 245 and 345.

Figure 5 shows in detail the solids discharge outlet 342 in association with solids at repose in chamber 41. When solids are in chamber 41 they form a compact body of solids 49 therein. In Figure 5 no flow-motivating gas is being supplied to the solids receiving chamber 41; consequently solids 49 remain at rest in outlet 342 even though solids-conveying gas is passing upwardly through conduit 50 and is flowing past the open end of outlet 342.

Figure 6 is similar in all respects to Figure 5 except that flow-motivating gas is now being supplied to section 41 to exit through outlet 342 thus disturbing the angle of repose of solids 49 and causing them to flow from outlet 342 into conduit 50 to be entrained in the uprising gas stream.

The operation depicted in Figures 5 and 6 is the operation of only one of the outlets being described, however, the operation of all such outlets is similar and under normal conditions either all outlets are discharging at once or all outlets are not discharging at once. However, there may be cases where it is desirable to stop the flow from one or more outlets while maintaining solids flow from the remaining outlets or it may be desirable to have varying rates of flow in the various outlets. All of these variations are possible by manipulation of the flow regulating assemblies 45, 145, 245, etc.

Referring now to Figure 7: Figure 7 is a cutaway perspective view showing zones A, D, E and L of Figure 2 as well as the entry junction of conduit 50 and the cooling jacket 60. In Figure 7 the internal construction of solids receiving chamber 41 is illustrated. Discharge outlets 442, 542, 642 and 742 are shown extending into solids receiving chamber 41. This lateral extension of the discharge outlets is for the purpose of providing a solids-supporting surface to contain the non-flowing angle of repose which the solids normally assume and thus to prevent solids from flowing into conduit 50 unless motivating gas is being supplied through the corresponding gas inlet. Gas inlets 443, 543, 643 and 743 are shown, as are gas regulating assemblies 445, 545, 645 and 745. Flow-motivating gas supply conduit 51 and gas-manifold 44 are also shown. Section 50 extends above chamber 41 and passes into cooling jacket 60 which is provided with a coolant carrying conduit 62.

Figure 7 also shows the relative positions of the motivating gas inlets with respect to the solids discharge outlets and it is seen that the gas inlets are on substantially the same horizontal level as are the corresponding solids outlets. Referring to solids outlet 442 and gas inlet 443; if solids receiving chamber 41 is filled with solids, then air admitted at 443 will pass out through 442 because that will be the path of least resistance. Little or none of the motivating gas will flow upwardly or downwardly through chamber 41 because of the relatively greater resistance offered by the solids to gas flow in such directions.

Figure 8 is an exploded view of gas flow regulating assembly 445 shown in Figures 2 through 7. The elements of assembly 445 are similar to like elements making up assemblies 45, 145, 245 etc. shown in Figures 1 to 7, and a detailed description of assembly 445 will serve to describe all such nozzles. In Figure 8, the assembly 445 is made up of a conduit 446, a valve 447 and a union or other separable joint 448. An orifice plate 449 is provided to fit securely within union 448. Orifice plate 449 is equipped with a very small orifice or aperture 450. When in place, assembly 445 acts as a critical flow control valve. Orifice plate 449 with orifice 450 may be called a critical flow valve assembly. This assembly insures that a uniform supply of gas will flow from each of the several nozzles and that such gas flow will be substantially undisturbed by pressure veriations within the solids receiving section.

Although we have shown an embodiment utilizing eight discharge outlets for introducing solids into the transport conduit, it is to be emphasized that our invention is not limited to a specific number of outlets. The number of such outlets may be varied according to the type of material being transported, the desired concentration in the transport conduit, etc.

Whereas we have shown and described only an embodiment wherein solids are introduced into a solids transport conduit it is to be understood that our invention is not limited to such a combination. This invention may for instance be utilized as a solids distributing station whereby finely-divided solids are received in a single station for distribution to several separate stations. Thus in Figures 2 and 3, conduit 50 can be replaced by separate conduits leading from each outlet, that is, outlet 142 would lead to one conduit for gravity flow or fluidized transport, outlet 342 to a different conduit, etc. Moreover, it is unnecessary that the solids receiving section be vertical; it can be horizontal that the outlets spaced along its horizontal length and extending into the body of solids in the same manner as previously described. In case of a horizontal solids receiving section the solids feed entrance can be on the top side of such section.

*Example*

In laboratory tests an embodiment similar to that shown in Figures 2-8 inclusive was employed.

In the apparatus employed the dimensions of the solids receiving chamber were 4′ x 3″ x 2½″. Leading from a laboratory 4″ inside diameter fluidized solids reactor into the upper portion of this chamber was a 1½″ inside diameter conduit for feeding finely-divided solids into the chamber. Eight laterally extending discharge outlets were spaced along one side of the chamber and extending into such chamber. These outlets were of an inside diameter of ⅜″ and extended laterally into the chamber a distance of 1″. The eight outlets were located two on each of four levels, the first level being 2″ above the bottom of the chamber and the succeeding levels being located at 10″ intervals thereabove. Eight solids motivating gas inlets were provided and were located as shown in the drawings. Each such inlet was provided with a valve and orifice plate such as shown in Figure 8. A solids-transport conduit having a 1½″ inside diameter was provided. This conduit tapered to a rectangular conduit ½″ x 3″ for a distance of 4′. This 4′ length was externally fastened to the solids receiving section on the same side as the discharged outlets and common to all such outlets so that solids discharged from the outlets into the conduit.

After passing the length of the solids receiving chamber, the conduit was reformed to its original shape and passed through a 2″ inside diameter heat jacketed exchanger for a distance of nine feet, after which the conduit entered the freeboard space of the fluidized solids reactor.

Zinc concentrate of an average particle size of 67 microns was introduced to the reactor and heated therein under fluidizing conditions. Hot sand was discharged to the solids receiving section via the feeding conduit thus filling that chamber with a compact body of solids. Coolant water was circulated through the heat exchange jacket.

An uprising solids-conveying stream of gas was supplied to the solids-conducting conduit. This gas was supplied at the rate of 8.5 C. F. M. (20° C. and 1 atmosphere of pressure) and attained an upward velocity in the solids-free conduit of approximately 14 feet per second.

Solids-flow motivating gas was supplied to each gas-inlet at a rate of substantially .06 C. F. M. (20° C. and 1 atmosphere of pressure) and passed through each outlet at a velocity of substantially 0.75 foot per second, this latter velocity being based on gas passing through discharge outlets without solids reposing therein.

Under the foregoing conditions solids concentration of 12 pounds per cubic foot was attained in the solids-conducting conduit. Moreover, the flow of solids within the conduit was uniform and no slugging or intermittent solids flow was encountered.

The solids were continuously flowed in closed circuit from the fluidized bed of the reactor to pass through an external heat exchanger and return to the reactor, and a concentration of solids within the solids conducting conduit was attained that was significantly higher than previously attainable.

We claim:

1. Apparatus of the class described which comprises a fluidized solids reactor comprising an enclosed chamber, a gas permeable partition transversely thereof adapted to support a bed of solids fluidized thereon, means for supplying gas uprisingly through the partition at solids fluidizing velocities, means for feeding solids to the bed in the chamber, and means for removing gas from the chamber; characterized by means for removing solids from the fluidized bed of the chamber and in closed circuit to pass such solids through a heat exchanger and return them to the bed of the chamber, comprising means for conducting solids from the fluidized bed of the chamber to a further wall enclosed chamber adapted to contain a vertically extending body of finely-divided solids, the walls of such chamber being provided with a plurality of laterally directed discharge outlets, path-forming means leading to each outlet and having a solids-supporting surface extending inwardly from the outlet, means for projecting a plurality of streams of solids-motivating gas through the body to exit from the outlets, regulating means for controlling the velocities of the projected gas streams to be such as to unseat the supported solids and deflect them through the outlets, a conduit common to all the outlets for receiving solids discharged from the outlets and leading from a point outside the reactor to a point within the chamber of the reactor, means for flowing a solids-transporting gas stream upwardly through the conduit to transport away solids discharged from the outlets and return such solids to the chamber of the reactor, and a heat exchange jacket enveloping a length of said conduit between the point where said conduit is common to all of the solids outlets and the point where said conduit reenters the reaction chamber.

2. In apparatus for discharging finely divided solids from an enclosed body thereof, comprising an enclosed chamber adapted to contain a single body of such solids, means for supplying solids to the chamber, a gas inlet along with a corresponding laterally directed discharge outlet in the wall of the chamber, said outlet having integrated therewith means for preventing the flow of normally reposed solids from the outlet, said gas inlet being so located with respect to said outlet that when the chamber is filled with solids, gas supplied through the inlet will project through the body of solids to exit from the outlet thereby deflecting reposed solids through said outlet, and means for regulating the quantity of gas supplied to the inlet; the improvement which comprises a plurality of said gas inlets along with a plurality of corresponding discharge outlets in the wall of the chamber, there being a corresponding gas inlet for each outlet, each of said inlets with its corresponding outlet being so located with respect to each other and to the remaining inlets and outlets that when the chamber is filled with solids there is formed a plurality of discharge zones functionally remote from each other, whereby gas admitted at any inlet will deflect solids only from its corresponding outlet.

References Cited in the file of this patent

UNITED STATES PATENTS

| Number | Name | Date |
|---|---|---|
| 773,909 | Watters | Nov. 1, 1904 |
| 1,730,195 | Davis | Oct. 1, 1929 |
| 1,971,852 | Goebels | Aug. 28, 1934 |
| 2,316,814 | Schemm | Apr. 20, 1943 |
| 2,358,497 | Egloff | Sept. 19, 1944 |
| 2,398,759 | Angell | Apr. 23, 1946 |
| 2,403,375 | Kassel | July 2, 1946 |
| 2,518,693 | Jahnig | Aug. 15, 1950 |
| 2,550,922 | Gullette | May 1, 1951 |